United States Patent
Ashton

(10) Patent No.: US 7,103,224 B2
(45) Date of Patent: Sep. 5, 2006

(54) METHOD AND SYSTEM FOR AUTOMATIC IDENTIFICATION AND QUANTIFICATION OF ABNORMAL ANATOMICAL STRUCTURES IN MEDICAL IMAGES

(75) Inventor: Edward Ashton, Webster, NY (US)

(73) Assignee: VirtualScopics, LLC, Rochester, NY (US)

( * ) Notice: Subject to any disclaimer, the term of this patent is extended or adjusted under 35 U.S.C. 154(b) by 394 days.

(21) Appl. No.: 10/759,060

(22) Filed: Jan. 20, 2004

(65) Prior Publication Data

US 2004/0146204 A1    Jul. 29, 2004

Related U.S. Application Data

(62) Division of application No. 10/262,672, filed on Oct. 2, 2002, now Pat. No. 6,731,782.

(51) Int. Cl.
*G06K 9/00* (2006.01)

(52) U.S. Cl. .................... 382/224; 382/131

(58) Field of Classification Search ............ 382/128, 382/131, 154, 173, 180, 224, 228, 282, 286; 702/156; 600/410, 425; 128/922; 250/363.04
See application file for complete search history.

(56) References Cited

U.S. PATENT DOCUMENTS

| | | | |
|---|---|---|---|
| 5,365,429 A | * | 11/1994 | Carman .................. 378/37 |
| 5,598,481 A | * | 1/1997 | Nishikawa et al. ........ 382/130 |
| 5,812,691 A | | 9/1998 | Udupa et al. |
| 5,987,094 A | | 11/1999 | Clarke et al. |
| 6,112,112 A | | 8/2000 | Gilhuijs et al. |
| 6,754,374 B1 | * | 6/2004 | Miller et al. ............ 382/128 |

OTHER PUBLICATIONS

Ge et al., "A Statistical 3-D Segmentation Algorithm for Classifying Brain Tissues in Multiple Sclerosis", Proc. of IEEE- Computer Based Medical Systems, pp. 455-460, 2001.*

Yu et al., "Comparative Performance Analysis of Adaptive Multispectral Detectors", IEEE Transactions on signal processing, vol. 41, No. 8, Aug. 1993, pp. 2639-2656.*

Reed et al., "Adaptive Multiple-Band CFAR Detection of an Optical Pattern with Unknown Spectral Distribution", IEEE Transactions on Acoustics, Speech, and Signal Processing, vol. 38, No. 10, Oct. 1990, pp. 1760-1770.*

Ashton, E.A, "Multialgorithm solution for automated Multispectral target detection," Optical Engineeering, vol. 38, No. 4, Apr. 1999, pp. 717-724.

Ashton, E.A., "Detection of Subpixel Anomalies In Multispectral Infrared Imagery Using an Adaptive Bayesian Classifier, "IEEE Transactions on Geoscience and Remote Sensing, vol. 36, No. 2, Mar. 1998, pp. 506-517.

* cited by examiner

Primary Examiner—Samir Ahmed
(74) Attorney, Agent, or Firm—Blank Rome LLP

(57) ABSTRACT

Abnormal regions in volumetric image sets are detected and delineated through the following technique. Noise is suppressed in the original data. The background is classified into one or more background classes. An exemplar is identified. Essentially similar structures throughout the volume are identified; a directed clustering technique has been developed for doing so. Quantitative information (lesion volume, shape, etc.) is extracted and output to database.

4 Claims, 4 Drawing Sheets

METHOD AND SYSTEM FOR AUTOMATIC IDENTIFICATION AND QUANTIFICATION OF ABNORMAL ANATOMICAL STRUCTURES IN MEDICAL IMAGES

REFERENCE TO RELATED APPLICATIONS

The present application is a divisional of U.S. patent application Ser. No. 10/262,672, filed Oct. 2, 2002, now U.S. Pat. No. 6,731,782.

FIELD OF THE INVENTION

The present invention is directed to a method and system for detection and delineation of abnormal regions in volumetric image sets and is more particularly directed to such a method and system in which the detection and delineation are automated through the use of spectral and spatial information.

DESCRIPTION OF RELATED ART

Numerous disease processes are characterized by the development of lesions that are structurally and compositionally distinct from surrounding healthy tissue. Some examples include multiple sclerosis and Alzheimer's disease, which are characterized by the development of brain lesions or plaques, and the sub-set of cancers that include the development of solid tumors in the brain, bones, or organs. In order to assess the progress or response to treatment of these diseases, it is necessary to obtain some measure of the patient's total lesion burden. In some cases, it is also helpful to know specific things about the structure of individual lesions.

Clearly, any accurate measure of a complex three-dimensional structure requires a three-dimensional image set. For this reason, magnetic resonance imaging (MRI) and computed tomography (CT), which provide complete volume imagery, are preferred over plain films for these assessments. Once the imagery has been obtained, however, any assessment requires the location, identification, and delineation of all lesions within the volume. Current standard practice requires an expert, typically a radiologist, to read each of the 30–100 images in the volume set, identify any lesions present, and trace out the boundaries of each lesion using specialized computer software. The traced boundaries are then used to calculate lesion volumes and other biomarkers.

This procedure has a number of obvious drawbacks. First, it is both tedious and time consuming. Manual tracing of a single volume data set can take anywhere from 15 minutes to two hours or more, depending on the number of images in the set and the number of lesions per image. Second, because manual outlining is heavily dependent on the opinion of the observer, it produces results that are subject to both error and bias. Recent studies have shown coefficients of variation of 5% or more for repeated tracings of the same structures by a single observer, and of up to 50% in some cases for tracings of structures by multiple observers. Such wide variability renders the results of such an analysis nearly useless, and points out a clear need for an improved, preferably automated, method of measurement. Some examples of prior work in this field include:

[1] E. Ashton et al., "Automated Measurement of Structures in CT and MR Imagery: A Validation Study" *Proc. of IEEE—Computer Based Medical Systems*, pp. 300–305 (2001).

[2] R. Chung, C. Ho, "3-D Reconstruction from tomographic data using 2-D active contours" *Computers and Biomedical Research* (33), pp. 186–210 (2000).

[3] K. Juottonen et al. "Volumes of the entorhinal and perirhinal cortices in Alzheimer's disease" *Neurobiology of Aging* (19), pp. 15–22 (1998).

[4] E. Ashton, K. Parker, M. Berg, C. Chen, "A Novel Volumetric Feature Extraction Technique with Applications to MR Images" *IEEE Trans. Medical Imaging* (16), pp. 365–371 (1997).

[5] E. Ashton et al., "Segmentation and Feature Extraction Techniques, with Applications to MRI Head Studies" *Magnetic Resonance in Medicine* (33), pp. 670–677 (1995).

[6] D. Taylor, W. Barrett, "Image segmentation using globally optimum growth in three dimensions with an adaptive feature set" *Visualization in Biomedical Computing*, pp. 98–107 (1994).

[7] I. Carlbom, D. Terzopoulos, K. Harris, "Computer assisted registration, segmentation, and 3-D reconstruction from images of neuronal tissue sections" *IEEE Trans. Medical Imaging* (13), pp. 351–362 (1994).

[8] F. Cendes et al., "MRI volumetric measurement of amygdala and hippocampus in temporal lobe epilepsy" *Neurology* (43), pp. 719–725 (1993).

All of the above referenced work describes schemes that require a human observer to identify the location of each lesion in the volume manually. Most also require some operator input regarding lesion shape and size. These limitations reduce the precision advantage provided over pure manual tracing by introducing subjective opinion into the identification process, and reduce the speed advantage by requiring extensive operator input. Prior work in the area of automated detection of abnormal regions in imagery using grayscale or spectral information includes:

[9] Z. Ge, V. Venkatesan, S. Mitra, "A Statistical 3-D Segmentation Algorithm for Classifying Brain Tissues in Multiple Sclerosis" *Proc. of IEEE—Computer Based Medical Systems*, pp. 455–460 (2001).

[10] K. Van Leemput et al., "Automated Segmentation of Multiple Sclerosis Lesions by Model Outlier Detection" *IEEE Trans. Medical Imaging* (20), pp. 677–688 (2001).

[11] E. Ashton, "Multialgorithm solution for automated multispectral target detection" *Optical Engineering* (38), pp. 717–724 (1999).

[12] E. Ashton, "Detection of sub-pixel anomalies in multspectral infrared imagery using an adaptive Bayesian classifier" *IEEE Trans. Geoscience and Remote Sensing* (36), pp. 506–517 (1998).

[13] E. Ashton, A. Schaum, "Algorithms for the Detection of Sub-Pixel Targets in Multispectral Imagery" *Photogrammetric Engineering and Remote Sensing* (64), pp. 723–731 (1998).

[14] R. Muise, "Coastal mine detection using the COBRA multispectral sensor" *SPIE Detection Remediation Tech. Mines Minelike Targets* (2765), pp. 15–24 (1996).

[15] T. Watanabe et al., "Improved contextual classifiers of multispectral image data" *IEICE Trans. Fundamentals Elect. Commun., Comput. Sci.* (E77-A), pp. 1445–1450 (1994).

[16] X. Yu, I. Reed, A. Stocker, "Comparative performance analysis of adaptive multi-spectral detectors" *IEEE Trans. Signal Processing* (41), pp. 2639–2656 (1993).

[17] I. Reed, X. Yu, "Adaptive multiple-band CFAR detection of an optical pattern with unknown spectral distribution" *IEEE Trans. Acoustics, Speech, Signal Processing* (38), pp. 2639–2656 (1990).

The systems described in these references have very similar theoretical bases and suffer from two common limitations. First, they make primary use only of either spatial/grayscale information (9,10) or spectral signature (11–17). Second, all of these systems operate by forming a statistical model of common background tissues and then searching for outliers. The resulting lack of a priori target information causes these systems to be non-specific and to have impractically high false alarm rates.

SUMMARY OF THE INVENTION

It will be readily apparent from the above that a need exists in the art to overcome the above-noted problems caused by existing techniques for identification and delineation of lesion boundaries. It is therefore an object of the invention to detect and delineate abnormal structures with higher accuracy.

It is another object of the invention to allow increased speed in the detection and delineation of abnormal structures.

It is yet another object of the invention to remove human error from the detection and delineation of abnormal structures.

It is still another object of the invention to reduce the rate of false alarms.

To achieve the above and other objects, the present invention makes use of spectral and spatial information to provide automated detection and delineation of abnormal structures. The present invention goes beyond and improves the work described in these references in two ways. First, it uses statistical techniques which permit the use of significant spatial and spectral information. Second, it allows for a directed search for a particular grayscale or spectral anomaly, presented, e.g., as a user-defined exemplar, whereas the prior work focuses on background characterization and generalized anomaly detection. This allows the system described in this work to be both sensitive and specific, providing a high probability of detection coupled with a low false alarm rate.

The present invention provides a system and method for detection and delineation of abnormal regions in volumetric image sets through five basic steps:

(1) Noise suppression in the original data through digital filtering, including either low-pass or median filtering.
(2) Background characterization.
(3) Identification of an exemplar.
(4) Identification of statistically similar structures throughout the volume. A technique for doing so, called directed clustering, will be disclosed, although any suitable decision metric can be used.
(5) Extraction of quantitative information (lesion volume, shape, etc.) and output, e.g., to a database.

While various techniques which by themselves are known in the prior art can be incorporated into the present invention, their use in the context of the present invention is considered to be novel.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

The preferred embodiment of the present invention will now be described in detail with reference to the drawings.

Figure 1:
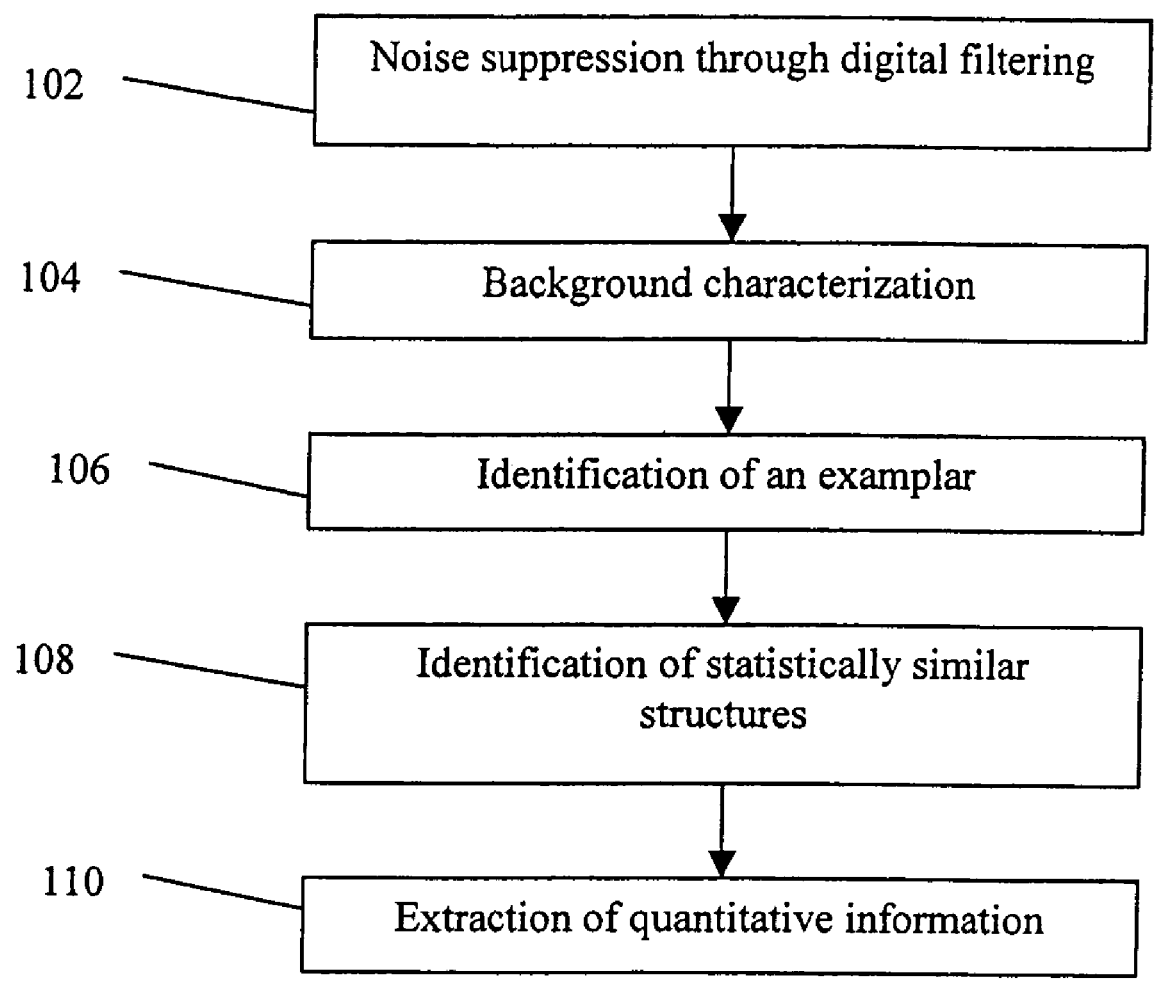
FIG. 1 shows a flow chart of the process according to the preferred embodiment.

FIG. 1 shows a flow chart of the operations of the preferred embodiment. The preferred embodiment provides a system and method for detection and delineation of abnormal regions in volumetric image sets through five basic steps:

Step 102: Noise suppression in the original data through digital filtering, including either low-pass or median filtering. Details of these processes can be found in the following reference:

[18] R. Gonzalez, R. Woods, *Digital Image Processing*, Addison-Wesley Publishing Co. (1992).

Step 104: Background characterization using an adaptive Bayesian classifier to classify the background voxels into at least one background class, which will be used in step 108. Adaptive Bayesian classification is described in detail in references (4, 5, 12).

Step 106: Identification of an exemplar using manual tracing, semi-automated tracing, statistical region growth, or geometrically constrained region growth. Semi-automated tracing is described in detail in reference (5). Statistical region growth is described in detail in reference (6). Geometrically constrained region growth is described in detail in references (1,4).

Step 108: Identification of statistically similar structures throughout the volume using directed clustering, which will be explained below.

Step 110: Extraction of quantitative information (lesion volume, shape, etc.) and output to database. Methods for extraction of relevant quantitative information from an identified region are given in reference (1).

Directed clustering, as performed in step 108, is the process of identifying regions throughout the image set that have statistical properties similar to those of the exemplar region identified in step 106. The key assumptions of this algorithm are that the volume is primarily composed of a number of common background classes (tissue types) (as determined in step 104) and that it also contains one or more sparsely represented target classes (lesion types). Furthermore, it is assumed that the statistical distribution of the voxels in each of these classes can be accurately described using some combination of statistical descriptors. Such descriptors might include a mean value, a vector of mean values, a variance value, a covariance matrix, or some set of statistical priors. Directed clustering will now be explained with reference to the flow chart of FIG. 2.

In step 202, initial statistical descriptors are calculated using the voxels contained in the exemplar region. In step 204, initial background statistical descriptors are calculated using the classification map generated in step 104.

Each voxel in the volume is assigned in step 206 to the class that minimizes the discriminant appropriate to the selected statistical descriptor. In the case in which each distinct class is described by a mean vector and a covariance matrix, $$g_i(x) = -\ln|R_i| - (x-m_i)^t R_i^{-1}(x-m_i)$$

where i is an index identifying a particular background or target class, R is the class covariance matrix, m is the class mean, and x is the signature of the voxel under consideration. Note that this assumes a multivariate normal class model. In the case in which each distinct class is described by a mean vector, covariance matrix and prior probability $p(\omega_i)$, $$g_i(x) = \ln p(\omega_i) - \tfrac{1}{2}\ln|R_i| - (x-m_i)^t R_i^{-1}(x-m_i)$$

In the case in which each distinct class is described by a mean vector and a prior probability, but a single global covariance matrix is assumed to describe all classes, $$g_i(x) = \ln p(\omega_i) - (x-m_i)^t R^{-1}(x-m_i).$$

In the case in which each distinct class is described by a mean vector and a single global covariance matrix is assumed to describe all classes, $$g_i(x) = -(x-m_i)^t R^{-1}(x-m_i).$$

In the event that the data is scalar (CT or single pulse sequence MRI), R is simply replaced by class variance, and m becomes the scalar class mean.

After class assignment is complete, background class statistics are re-estimated in step 208 based on the new class populations. Target class statistics are not re-estimated, but rather remain static.

The process of re-estimating voxel classification and class statistics is repeated until it is determined in step 210 that a stable solution is achieved. At that point, in step 212, all voxels assigned to the target classes are marked as lesions, and the lesion map is then passed on to step 110 for final processing.

Figure 2:
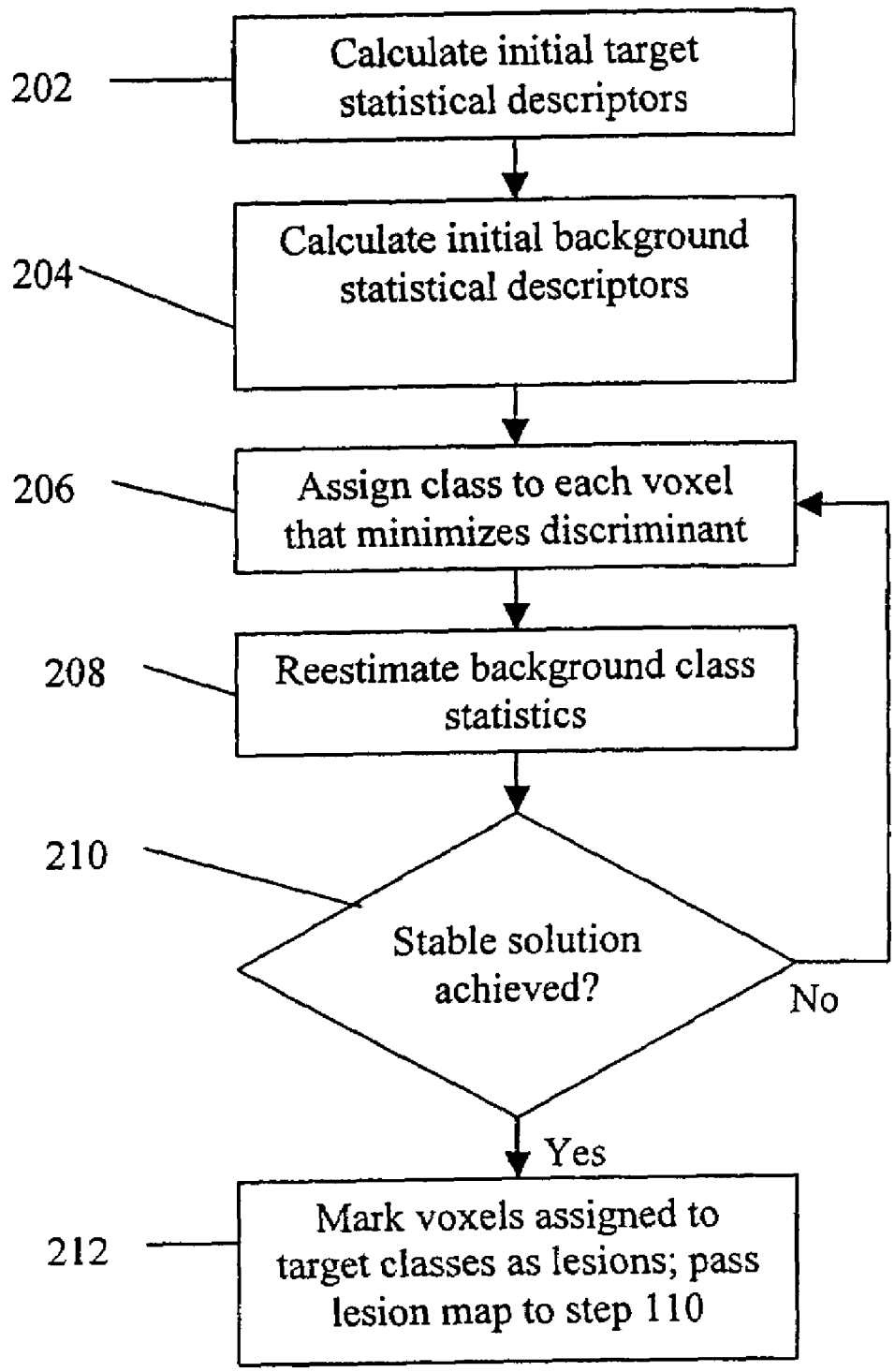
FIG. 2 shows a flow chart of a directed clustering technique used in the process of FIG. 1.
Figure 3:
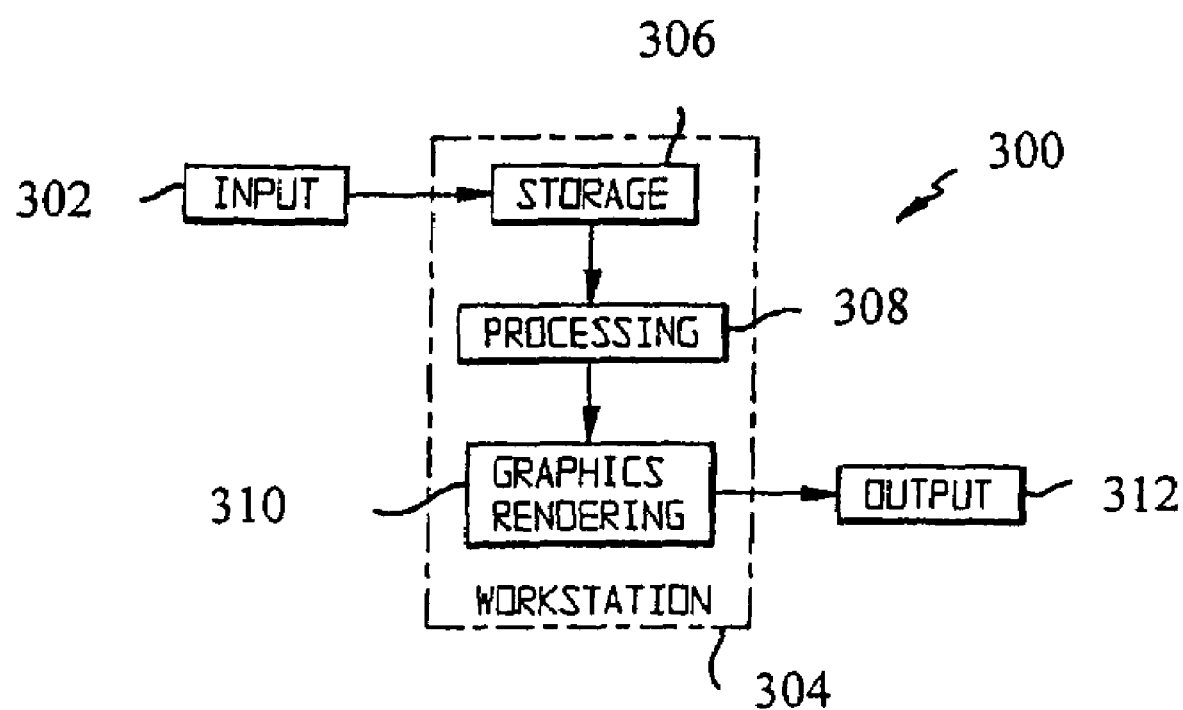
FIG. 3 shows a block diagram of a system on which FIGS. 1 and 2 can be carried out.

The process of FIGS. 1 and 2 can be carried out using any suitable hardware, of which an illustrative example will be disclosed with reference to FIG. 3. The system 300 includes an input device 302 for input of the original image data, any inputs used in step 106, and the like. The information input through the input device 302 is received in the workstation 304, which has a storage device 306 such as a hard drive, a processing unit 308 for performing the processing disclosed above, and a graphics rendering engine 310 for preparing the data for viewing. An output device 312 can include a monitor for viewing the images rendered by the rendering engine 310, a further storage device such as a video recorder for recording the images, or both. Illustrative examples of the workstation 304 and the graphics rendering engine 310 are a Silicon Graphics Indigo workstation and an Irix Explorer 3D graphics engine, although any other suitable devices can be used.

Experimental data will now be disclosed. One important application of the present invention is the detection and measurement of white matter lesions in multiple sclerosis patients. Current practice requires manual tracing to accomplish this task. This process is time consuming, requiring 60–90 minutes of expert time per case, and is subject to inter-operator variability of up to 30% [10].

Figure 4A:
FIGS. 4A–4C show raw image data.
Figure 4B:
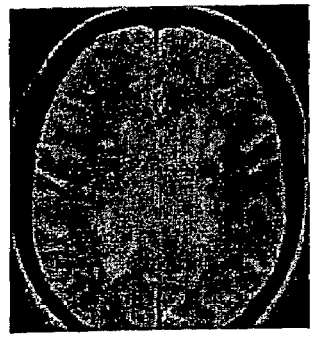
Figure 4C:
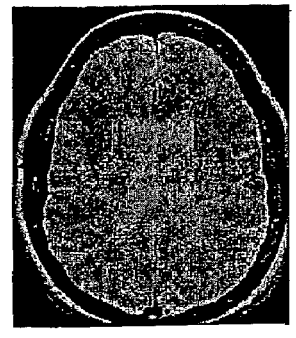
Figure 5A:
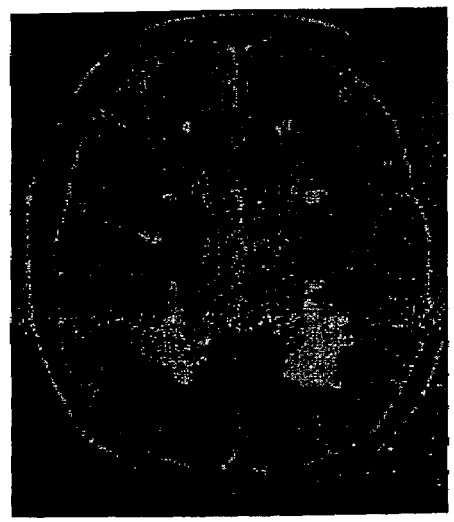
FIGS. 5A and 5B show sample manual and automated lesion identifications, respectively.
Figure 5B:

In order to evaluate the effectiveness of the preferred embodiment for automated lesion identification, the inventors first obtained three multi-spectral MRI scans for MS patients from the University of Rochester Medical Center. Sample images of single image planes from each of these volumes are given in FIGS. 4A–4C. Multiple sclerosis lesions were identified and delineated in each of these volumes both manually and automatically in ten separate trials by a single expert operator. These results were used to calculate intra-operator variability for both manual and automated measurement. Each data set was also evaluated once both manually and automatically by five separate expert users. Sample manual and automated lesion identifications for one image are given in FIGS. 5A and 5B, respectively. These results were used to calculate inter-operator variability. Finally, the mean manual results were compared to the mean automated results in order to estimate global accuracy.

Outputs for the measurement process included both a visual representation of all lesions and volume measurement for each lesion as well as total lesion burden in cubic millimeters. Experimental results showed a mean patient evaluation time of 90 minutes for manual lesion identification, versus 3 minutes for lesion identification using the automated system described in this work. Intra-operator coefficients of variation were 6.5% for manual identification and 1.3% for automated identification. Inter-operator coefficients of variation were 22.1% for manual identification and 5.2% for automated identification. Bias relative to manual results was 11.41%. These results show a dramatic improvement over current techniques in terms of both speed and precision. Moreover, the observed bias in this experiment is well within the error bar of the manual measurement.

While a preferred embodiment of the present invention has been set forth in detail above, those skilled in the art who have reviewed the present disclosure will readily appreciate that other embodiments can be realized within the scope of the present invention. For example, when a specific technique from the prior art is disclosed for performing a certain function, other techniques, already known or yet to be developed, can be used instead. Also, while noise suppression has been taught, it may be unnecessary in some cases, e.g., if very high signal-to-noise scanners are used. Therefore, the present invention should be construed as limited only by the appended claims.

What is claimed is:

1. A method for locating a target region in a volumetric image set, the image set comprising a plurality of voxels, each of the plurality of voxels to be assigned to at least one target class or at least one background class, the method comprising:
   (a) calculating an initial target class statistical descriptor for the at least one target class;
   (b) calculating an initial background statistical descriptor for the at least one background class;
   (c) assigning a class to each of the plurality of voxels for which a discriminant calculated from a class statistical descriptor for the class is a minimum;
   (d) reestimating a background statistical descriptor for the at least one background class; and
   (e) locating the target region to include each of the voxels which have been assigned to the at least one target class.

2. The method of claim 1, wherein steps (c) and (d) are repeated until a stable solution is achieved, and then step (e) is performed.

3. A system for locating a target region in a volumetric image set, the image set comprising a plurality of voxels, each of the plurality of voxels to be assigned to at least one target class or at least one background class, the system comprising:
   an input device for receiving the volumetric image set; and a processor, in communication with the input device, for:
(a) calculating an initial target class statistical descriptor for the at least one target class;
(b) calculating an initial background statistical descriptor for the at least one background class;
(c) assigning a class to each of the plurality of voxels for which a discriminant calculated from a class mean and a class covariance for the class is a minimum;
(d) reestimating a background statistical descriptor for the at least one background class; and
(e) locating the target region to include each of the voxels which have been assigned to the at least one target class.

4. The system of claim 3, wherein the processor repeats steps (c) and (d) until a stable solution is achieved and then performs step (e).

* * * * *